United States Patent [19]

Shimada

[11] Patent Number: 4,840,430

[45] Date of Patent: Jun. 20, 1989

[54] AUTOMOTIVE SEAT AND METHOD OF FORMING SAME

[75] Inventor: Makoto Shimada, Akishima, Japan

[73] Assignee: Tachi-S Co., Ltd., Tokyo, Japan

[21] Appl. No.: 143,222

[22] Filed: Jan. 4, 1988

[51] Int. Cl.$^4$ ............................................. A47C 7/02
[52] U.S. Cl. .................... 297/452; 156/212; 297/459; 297/460; 297/DIG. 1
[58] Field of Search ............... 156/212, 213, 216, 219, 156/228; 297/DIG. 1, 452, 458, 459, 460

[56] References Cited

U.S. PATENT DOCUMENTS

| | | | |
|---|---|---|---|
| 3,612,607 | 10/1971 | Lohr | 297/452 |
| 4,377,609 | 3/1983 | Bartoli | 297/452 |
| 4,537,646 | 8/1985 | Hoyle | 156/212 |
| 4,555,141 | 11/1985 | Nemoto | 297/452 |
| 4,699,427 | 10/1987 | Kobayashi | 297/452 |

Primary Examiner—James T. McCall
Attorney, Agent, or Firm—Browdy and Neimark

[57] ABSTRACT

An automotive seat comprising a main pad having an unevenly shaped upper surface, a sub pad bonded to such upper surface of the main pad and a covering member bonded to the sub pad, and a method of forming the automotive seat.

According to the method disclosed, a sub pad of a flat-plate-like slab material and a covering member are firstly pressed and bonded together in a shape conforming to the unevenly shaped upper surface of a main pad, and then those two bonded elements are bonded to the upper surface of the main pad.

In this way the seat is obtained in which the sub pad is bonded positively along the unevenly shaped upper surface of the main pad.

8 Claims, 2 Drawing Sheets

AUTOMOTIVE SEAT AND METHOD OF FORMING SAME

BACKGROUND OF THE INVENTION

1. Field of the Invention

The present invention relates to an automotive seat and a method of forming the same, and particularly relates to a method in which a covering member is affixed over a foam cushion body formed in a mold to a predetermined outer configuration of a seat and then both of them are integrally bonded together, and also relates to a resultant seat produced by such method.

2. Description of the Prior Art

In the seat assembling process, a foaming method using a mold has been adopted to facilitate the formation of a foam cushion body into a predetermined shape. Hitherto, subsequent to such foaming step, a covering member is bonded to the surface of the foam cushion body be means of an adhesive.

However, it has been found as drawback that during the foaming process, a hard layer of a high density is created in the surface of the cushion body because the portion of liquid basic foam material adjacent to the working surface of the mold is not foamed and cured into a hard thin layer in contrast to the foamed soft interior of the cushion body, and as such, a hard undesired touch is felt by an occupant who sits thereupon.

To avoid this drawback, there has been proposed such method wherein a sub pad made of a slab material is laminated upon the upper surface of the cushion body.

However, almost all of the cushion bodies are at their upper surfaces formed in an uneven manner for the purpose of improving the seating touch, which is the cause of difficulty in bonding the flat-plate-like sub pad to the unevenly formed surface of the cushion body. In other words, when a flat sub pad is laminated on such unevenly formed surface of the cushion body and this lamination is covered with a covering member, the sub pad, by reason of its elasticity to recover itself to the original flat shape, is not bonded closely along the uneven upper contour of the cushion body. Consequently, a desired outer configuration of seat can not be formed satisfactorily.

SUMMARY OF THE INVENTION

With a view to eliminating the above-noted drawbacks of the conventional method, it is therefore a purpose of the present invention to provide a method of forming an automotive seat which permits a closely bonding of a slab sub pad together with a covering member to an unevenly formed upper surface of a cushion body, and provide an automotive seat formed by such method.

In accomplishing the above purpose, the present invention involves the steps of:

(a) placing a slab sub pad on the rear of a covering member;

(b) applying a pressure to the sub pad and covering member so that they are formed in a shape corresponding to the shape of the uneven upper surface of a main pad, and bonding them integrally; and (c) bonding such two bonded elements to the main pad integrally.

Accordingly, it is seen that the sub pad is formed by application of a pressure into a shape corresponding to the uneven upper contour of the main pad, in advance, prior to the subsequent bonding processes, so as to bring the sub pad to a close contact with the uneven upper surface of the main pad, and that, during such press formation process, the covering member is bonded by an adhesive to the sub pad, to thereby retain the predetermined original shape of the sub pad.

Thus, according to the present invention, a resultant seat comprises a main pad having an unevenly formed upper surface and a sub pad formed in a shape conforming to the uneven shape of the main pad, the sub pad being bonded integrally with a covering member. Thus, it is understood in this seat that before being bonded with the main pad, the sub pad has previously been formed in an identical shape to the uneven upper surface of the main pad, which ensures a more positive bonding of the sub pad to the main pad in conformity with the upper surface of the main pad.

The resultant seat, therefore, has a clear-cut outer shape with a high shape retainablility.

It is another purpose of the present invention to provide an automotive seat which is aesthetically improved in outer appearance.

To this end, in both lateral surfaces of the seat, there is provided a decorative recessed groove between the main and sub pads. Such recessed groove serves to simulate the so-called "loose cushion seat" appearance, giving an attractive high class look to the seat.

DETAILED DESCRIPTION OF PREFERRED EMBODIMENTS OF THE INVENTION

Figure 1:
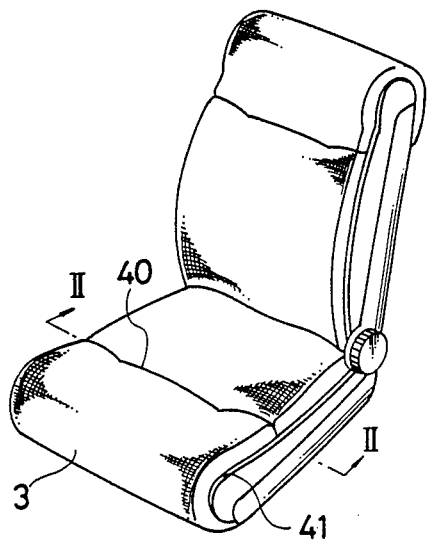
FIG. 1 is a perspective view of a seat formed in accordance with the present invention method.

Referring to FIG. 1, there is illustrated a resultant automotive seat produced in accordance with a method of the present invention to be described later. Designations (40)(41) denote decorative recessed grooves.

Figure 2:
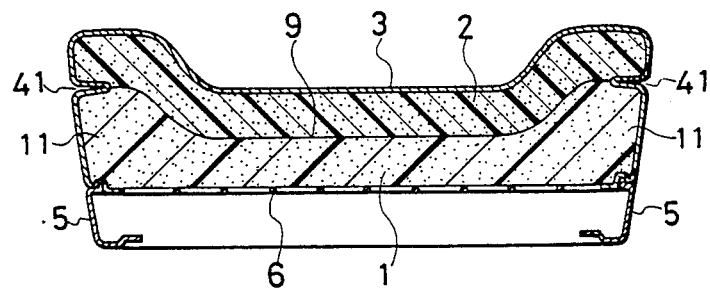
FIG. 2 is a sectional view taken along the line II—II in the FIG. 1.

Referring to FIG. 2, there is shown a sectional view of such automotive seat, in which a sub pad (2) made of a slab material (urethane foam material) is laminated upon a main pad (1) made of a foam material (urethane foam material) which has undergone a foaming process using a mold, and a covering member (3) is affixed over the outer surfaces of the sub pad (2) as well as over the lateral surfaces of the main pad (1). Further, in this figure, the main pad (1) is shown as having a raised portion (11) formed in each of its right and left side portions, thus being in such shape that its central portion is recessed, and an adhesive (9) is applied between the sub pad (2) and main pad (1) so that the former pad is integrally bonded along such uneven upper surface of the latter one. On both lateral surfaces of the seat, formed are the decorative recessed grooves (41) in the boundary between the sub and main pads (2)(1). Numerals (5) and (6) stands for a seat frame provided in the seat, and a spring member extended in the seat frame (5), respectively.

Figure 3:
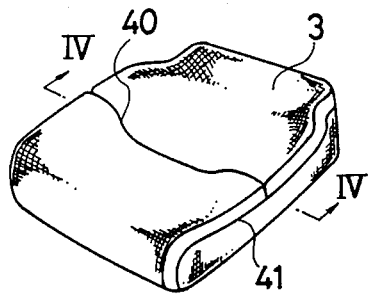
FIG. 3 is a perspective view of a resultant seat in which a sub pad is bonded to a main pad.
Figure 4:
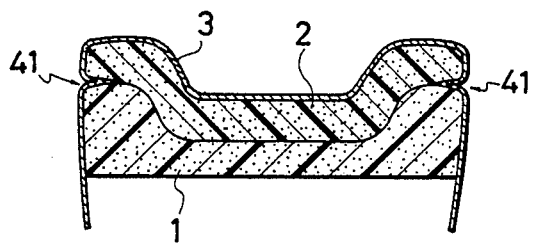
FIG. 4 is a sectional view taken along the line IV—IV in the FIG. 3.

FIGS. 3 and 4 show the state of a seat body produced after a bonding process for bonding the sub pad (2) to the main pad (1) together with the covering member (3), which will be described below.

Figure 5:
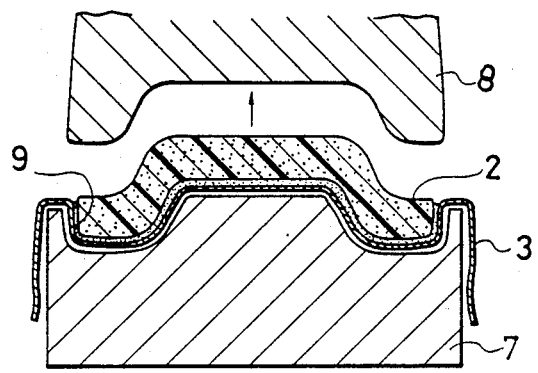
FIG. 5 is a sectional view which explanatorily shows the state in which a covering member and the sub pad have been formed and bonded together.

Now, with reference to FIGS. 5 and 6, a description will be given of a process for forming the seat in accordance with the present invention.

In the present embodiment, a press working device (not shown) is employed, which has an upper die (8) and lower die (7) as shown in the figures.

At first, the covering member (3) is placed on the lower die (7) such that the rear side of the covering member (3) faces outwardly to the oppositely disposed upper die (8). The working surface of the lower die (7) corresponds in shape to that of the upper die (8) which in turn corresponds in shape to such recessed upper surface of the main pad (1).

The upper and lower dies (8)(7) are designed to form the sub pad (2) so that it has a uniform thickness over its entire length.

Then, the sub pad (2) made of a flat-plate-like slab material is laminated upon the covering member (3) and, by lowering the upper die (8), the sub pad (2) is pressed against the covering member (3) and bonded thereto by use of an adhesive (9), so that the covering member (3) is formed in conformity with a predetermined contour of seat, whereas the non-bonded surface of the sub pad (2) assumes a shape conforming to the upper contour of the main pad (1).

Figure 6:
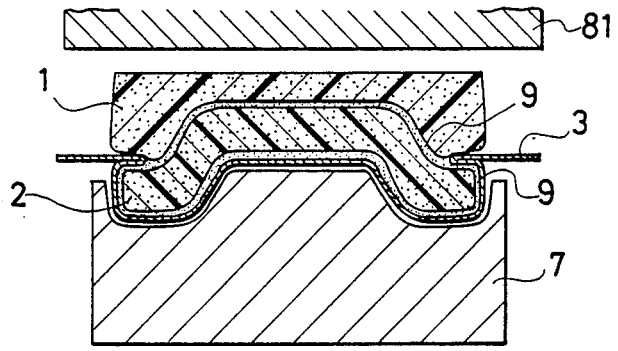
FIG. 6 is a sectional view which explanatorily shows the state in which the main pad is to be bonded integrally to the sub pad.

After the completion of bonding together the covering member (3) and sub pad (2), the upper die (8) is raised from those two bonded elements, and as shown in FIG. 6, the main pad (1) is placed on the non-bonded surface of the sub pad (2).

Next, another different upper die (81) having a plane pressure surface is lowered and pressed against the main pad (1) so that the main pad (1) is bonded to the sub pad (2) by virtue of an adhesive (9). (FIG. 6). During this process, care is taken to ensure that the covering member (3) is part-way inserted into between the main and sub pads (1)(2) and bonded therein, so as to form the decorative recessed grooves (41) mentioned above.

In this context, both main and sub pads (1)(2) may be so formed as to create a recessed groove along the boundary between the two pads when they are laminated together, to thereby permit the partial insertion and bonding of the covering member (3) into the recessed groove for formation of a decorative deep groove in the lateral surfaces of seat.

Thereafter, both upper and lower dies (81)(7) are moved away from the bonded element, whereupon there is obtained such resultant seat body as in FIGS. 3 and 4.

It is noted that the free remainder of the covering member (3) extending away from the seat body is anchored to the inner portion of the seat frame (5) as seen in FIG. 2, or may be turned over the frame (5) and secured to a wire member or spring member (6) by means of a hog ring.

With the present invention constructed above, the following effects are produced advantageously:

(1) By the reason that the sub pad is formed by application of pressure in conformity with the uneven upper contour of the main pad, the sub pad can be brought into close contact with the uneven upper surface of the main pad. Further, the bonding of the sub pad to the main pad during such press forming process is quite effective for attaining a constant shape retainability of the sub pad, whereupon the sub pad retains its formed shape as it is.

(2) Due to the effects in (1) above, the sub pad with the covering member bonded thereto can be uniformly bonded along the uneven upper surface of the main pad. Thus, it is possible to produce a seat in a predetermined shape without failure, and the resultant seat has a clear-cut outer shape wtih a high shape retainability.

(3) The seat of the present invention has a decorative recessed groove provided in its both lateral surfaces, which serves to simulate the so-called "loose cushion seat" of a two-cushion structure.

(4) The use of a slab material for the sub pad facilitates the ease with which the sub pad is bonded to both unevenly shaped covering member and main pad, and thus improves the bonding state of the sub pad relative to the covering member and main pad. Further, the lamination of such slab sub pad on the main pad formed with a mold provides a good seating touch, thereby enhancing the seating comfort.

The description above has just been given of preferred embodiments of the present invention, but it should be understood that the invention is not limited to the embodiments illustrated, but various other replacements, modifications and additions may be possible without departing from the scope and spirit of the appended claims for the invention.

What is claimed is:

1. An automotive seat comprising:
   a foam main pad which is so foamed in a mold that a central portion of its upper surface is recessed;
   a sub pad bonded to said main pad such that said sub pad conforms in shape to said upper surface of said main pad, wherein said sub pad is also bonded to a covering member; and
   a decorative recessed groove provided between said main pad and said sub pad such that it is defined laterally of said main and sub pads;
   wherein said sub pad is formed into an uneven shape, so that the size of said sub pad is conformed to that of said main pad, the free end part of said covering member being inserted into a boundary between said sub pad and said main pad.

2. The automotive seat according to claim 1, wherein said sub pad is formed of a flat-plate-like foam slab material.

3. A method of forming an automotive seat, comprising the steps of:
   providing a pre-formed main pad which has a recessed area defined in its central portion;
   applying subsequently pressure by means of a press working device to a foam sub pad and a covering member to reshape said foam sub pad into an uneven shape, and at the same time bonding said sub pad and covering member together, such that a non-bonded surface of said sub pad conforms in shape to said upper surface of said main pad while an upper surface of said covering member is formed in conformity with an outer contour of said seat; and
   thereafter, bonding said sub pad with said covering member bonded thereto to said upper surface of said main pad by means of an adhesive.

4. The method according to claim 3, wherein said press working device includes an upper die formed in a shape conforming to said upper surface of said main pad and a lower die formed in conformity with the shape of said upper die, and wherein the method includes the steps of:

applying a pressure, by means of said upper and lower die, to both said sub pad and covering member and at the same time bonding said sub pad and covering member together by means of an adhesive;

thereafter, removing said upper die from said sub pad and covering member, and placing said main pad upon said sub pad such that said upper surface of said main pad is superposed on said non-bonded surface of said sub pad; and applying a pressure, by means of an upper die having a plane pressure surface, to said main pad so as to bond said main pad integrally to said sub pad by means of an adhesive.

5. The method according to claim 3, wherein said sub pad is formed of a flat-plate-like slab material, prior to being pressed by said press working device.

6. The method according to claim 3, wherein it further comprises the step of mounting on a frame said main pad which has been bonded to said sub pad with said covering member bonded thereto.

7. The method according to claim 3, wherein it further comprises the steps of:

forming said main and sub pads so as to create a recessed groove along a boundary between said two pads when they are bonded together; and inserting and bonding a part of said covering member into said recessed groove, whereby a decorative deep groove is formed in said seat.

8. An automotive seat comprising:

a foam main pad having an upper surface which is recessed in a central portion thereof and raised at side portions thereof;

a sub pad/covering member subassembly extending across the entire upper surface of said foam main pad and being laminated thereto, said subassembly comprising a covering member and a generally planar sub pad reshaped to conform in shape to said upper surface of said main pad, said covering member being laminated to said reshaped sub pad along an upper surface thereof during reshaping thereof; and a decorative recessed groove provided along a boundary between said main pad and said sub pad such that it is defined laterally of said main pad and said sub pad, a portion of said covering member being inserted into said recessed groove.

* * * * *